(12) United States Patent
Kodera et al.

(10) Patent No.: US 10,971,349 B2
(45) Date of Patent: Apr. 6, 2021

(54) ION ANALYZER

(71) Applicant: Shimadzu Corporation, Kyoto (JP)

(72) Inventors: Kei Kodera, Kyoto (JP); Kosuke Hosoi, Kyoto (JP); Hideharu Shichi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/330,954

(22) PCT Filed: Nov. 18, 2016

(86) PCT No.: PCT/JP2016/084272
§ 371 (c)(1),
(2) Date: Mar. 6, 2019

(87) PCT Pub. No.: WO2018/092271
PCT Pub. Date: May 24, 2018

(65) Prior Publication Data
US 2019/0279857 A1  Sep. 12, 2019

(51) Int. Cl.
| | | |
|---|---|---|
| *H01J 49/00* | (2006.01) | |
| *H01J 49/16* | (2006.01) | |
| *H01J 49/06* | (2006.01) | |
| *G01N 27/622* | (2021.01) | |
| *H01J 49/14* | (2006.01) | |

(52) U.S. Cl.
CPC .......... *H01J 49/164* (2013.01); *G01N 27/622* (2013.01); *H01J 49/0004* (2013.01); *H01J 49/061* (2013.01); *H01J 49/142* (2013.01); *H01J 49/161* (2013.01)

(58) Field of Classification Search
CPC .............................. H01J 49/164; H01J 49/061
USPC .......................................... 250/281, 282, 288
See application file for complete search history.

(56) References Cited

U.S. PATENT DOCUMENTS

| | | | | |
|---|---|---|---|---|
| 5,118,937 A | * | 6/1992 | Hillenkamp | ..... G01N 27/44704 250/282 |
| 6,639,217 B1 | | 10/2003 | Li | |
| (Continued) | | | | |

FOREIGN PATENT DOCUMENTS

| | | |
|---|---|---|
| CN | 103875057 A | 6/2014 |
| DE | 4017805 A | 3/1991 |
| (Continued) | | |

OTHER PUBLICATIONS

International Search Report dated Feb. 7, 2017 for PCT application PCT/JP2016/084272.

(Continued)

*Primary Examiner* — Michael Maskell
(74) *Attorney, Agent, or Firm* — Muir Patent Law, PLLC

(57) ABSTRACT

An ion analyzer includes: a sample placement unit 2 on which a sample 1 is to be placed; an excitation beam irradiation unit 3 that irradiates the sample 1 placed on the sample placement unit 2 with an excitation beam in a direction perpendicular to a surface of the sample 1; a deflection unit 6 that makes at least some of ions generated from the sample 1 to fly in a direction deviating from an irradiation path of the excitation beam; and an analysis unit 8 disposed in a flight direction of ions deflected by the deflection unit 6, that separates and measures the ions in accordance with a predetermined physical quantity.

11 Claims, 3 Drawing Sheets

(56) References Cited

U.S. PATENT DOCUMENTS

| | | | |
|---|---|---|---|
| 7,180,058 B1* | 2/2007 | Izgarian | H01J 27/24 |
| | | | 250/281 |
| 2010/0065740 A1* | 3/2010 | Iwamoto | H01J 49/164 |
| | | | 250/288 |
| 2011/0049350 A1 | 3/2011 | Vestal | |
| 2013/0207000 A1 | 8/2013 | Günther et al. | |
| 2014/0239173 A1* | 8/2014 | Iwasaki | H01J 49/142 |
| | | | 250/282 |
| 2015/0287578 A1 | 10/2015 | Bendall et al. | |
| 2016/0163529 A1 | 6/2016 | Chen et al. | |
| 2016/0071716 A1 | 10/2016 | Brown et al. | |

FOREIGN PATENT DOCUMENTS

| | | |
|---|---|---|
| GB | 2236185 A | 3/1991 |
| JP | H03-89160 A | 4/1991 |
| JP | H07-161336 A | 6/1995 |
| JP | H09-45276 A | 2/1997 |
| JP | 2003-270208 A | 9/2003 |
| JP | 2013-101918 A | 5/2013 |
| KR | 10-2014-0086992 A | 7/2014 |
| WO | 2013/054937 A1 | 4/2013 |
| WO | 2013/134165 A1 | 12/2013 |

OTHER PUBLICATIONS

Written Opinion of the International Searching Authority (ISA237) dated Feb. 7, 2017 for PCT application PCT/JP2016/084272, submitted with a machine translation.

Extended European Search Report dated Oct. 15, 2019, for corresponding application EP 16 92 1829.

Second Office Action dated Mar. 10, 2020 for the corresponding Japanese Patent Application No. 2018-550967, submitted with a machine translation.

* cited by examiner

＃ ION ANALYZER

TECHNICAL FIELD

The present invention relates to an ion analyzer, such as a mass spectrometer or an ion mobility analyzer, that generates ions from a sample by irradiating the sample with an excitation beam, such as laser light, and analyzes the ions.

BACKGROUND ART

One of the sample ionization methods used in mass spectrometers is a laser desorption/ionization (LDI) method. In the LDI method, a surface of a sample is irradiated with laser light, where molecules of the sample are excited and ionized by the energy of the laser light. Molecules existing in a region of the surface of the sample irradiated with the laser light are selectively ionized. The LDI method includes a matrix-assisted laser desorption/ionization (MALDI) method. In the MALDI method, a material (a matrix material) that easily absorbs laser light and is easily ionized is applied to a surface of a sample, where the matrix material is microcrystallized incorporating the sample molecules. Then the microcrystallized matrix material is irradiated with laser light, so that the sample molecules are ionized. In the LDI method such as the MALDI method, a region of a sample surface to be measured is irradiated with laser light, and ions generated from the region undergo mass spectrometry. Furthermore, by performing mass spectrometry of ions released from each region while shifting the region irradiated with laser light on a sample surface (i.e., while scanning the sample surface with the laser light), it becomes possible to perform analysis to determine distribution of a material having a specific mass on the sample surface as well. Such a technique is called imaging mass spectrometry.

Patent Literature 1 illustrates a mass spectrometer including an ion source that generates ions using the LDI method. Patent Literature 1 discloses the configuration of this mass spectrometer simply with a block diagram as shown in FIG. 1, where, in a housing equipped with a light entrance window 100 on the top and an ion entrance hole 112 on the bottom, an ion optical system 108 is disposed in a lower part and a mass spectrometry unit 104 is disposed in an upper part. Patent Literature 1 describes the operation of the mass spectrometer as follows. The housing is disposed so that the ion entrance hole 112 faces a sample 110 placed on a sample placement table 96. Laser light emitted from a laser light source 92 is introduced into the light entrance window 100 by an optical fiber 98, and the sample 110 is irradiated with the laser light through the ion entrance hole 112. Ions are released from a surface of the sample 110 irradiated with the laser light and enter the housing through the ion entrance hole 112. The ions are focused by the ion optical system 108, separated according to their mass to charge ratio, and detected by the mass spectrometry unit 104. The sample placement table 96 is horizontally movable. By moving the sample placement table 96, a region to be measured of the surface of the sample 100 is irradiated with the laser light, and mass spectrometry is performed.

CITATION LIST

Patent Literature

Patent Literature 1: U.S. Pat. No. 6,639,217 B

SUMMARY OF INVENTION

Technical Problem

As described above, Patent Literature 1 describes the mass spectrometer only conceptually, and does not disclose its specific configuration (particularly, the configuration of the inside of the housing). As shown in FIG. 1, in the housing of this mass spectrometer, the path 102 of the laser light irradiated on the sample 110 and the flight path of the ions generated from the sample 110 toward the mass spectrometry unit 104 are the same. It involves a practical problem of how to prevent interference between the laser light and the flying ions in actually detecting the ions.

Above described is an example of a case where a sample is irradiated with laser light to generate ions from the sample. A similar problem occurs in a case where a sample is irradiated with an excitation beam, such as an electron beam or an ion beam, to generate ions from the sample, and the ions are detected. Furthermore, an ion mobility analyzer or the like that separates and measures ions generated from a sample on the basis of their mobility also has a similar problem. The present invention has been made to solve these problems.

Solution to Problem

An ion analyzer according to the present invention made to solve the above-described problems includes:

a) a sample placement unit on which a sample is to be placed;

b) an excitation beam irradiation unit configured to irradiate the sample placed on the sample placement unit with an excitation beam in a direction perpendicular to a surface of the sample;

c) a deflection unit configured to make at least some of ions generated from the sample to fly in a direction deviating from an irradiation path of the excitation beam; and d) an analysis unit disposed in a flight direction of ions deflected by the deflection unit, configured to separate and measure the ions in accordance with a predetermined physical quantity.

The excitation beam is, for example, laser light, an electron beam, or an ion beam. The term perpendicular does not necessarily mean being strictly perpendicular to the sample surface, and a little angle error of, for example, about ±5 degrees is allowed. In general, a sample is placed on the sample placement unit so that the sample surface becomes horizontal, and is irradiated with the excitation beam in a vertical direction; however, it is possible to adopt other disposition besides this.

The deflection unit may be constituted by, for example, an electrode disposed in a position deviating from the path of the excitation beam irradiated on the sample and a voltage applying unit that applies a given voltage to the electrode. More specifically, the deflection unit maybe constituted by an electrode disposed in a position deviating from the path of the excitation beam, and a voltage applying unit that applies a voltage of a polarity opposite to that of the ions to the electrode. In this case, the analysis unit is disposed on the same side as the electrode with respect to the path of the excitation beam. Alternatively, the deflection unit may be constituted by an electrode disposed in a position deviating from the path of the excitation beam, and a voltage applying unit that applies a voltage of the same polarity as the ions to the electrode. In this case, the analysis unit is disposed on the side opposite to the electrode with respect to the path of the excitation beam.

The predetermined physical quantity is, for example, a mass-to-charge ratio of the ions; in that case, the ion analyzer according to the present invention is a mass spectrometer.

In the ion analyzer according to the present invention, the sample is irradiated by the excitation beam from the direction perpendicular to the surface of the sample, so that the area of the region irradiated with the excitation beam is small, which enhances the spatial resolution of the analysis. Also, ions are generated from the region with high efficiency. In addition to that, some of the ions generated from the sample are focused, deflected and then introduced into the analysis unit without being interfered with the irradiation path of laser light.

In the ion analyzer according to the present invention, the deflection unit preferably deflects the ions in a direction orthogonal to the path of the excitation beam. Owing to this configuration, the analysis unit located after the deflection unit can be disposed away from an excitation beam optical system. Furthermore, by orthogonally disposing the excitation beam optical system and the analysis unit, the entire ion analyzer can be made compact without enlarging the ion analyzer in a specific direction.

Advantageous Effects of Invention

By using an ion analyzer according to the present invention, it is possible, in detecting ions, to prevent interference between an irradiation path of laser light irradiated on a sample and a flight path of ions generated from the sample toward an analysis unit.

DESCRIPTION OF EMBODIMENTS

A mass spectrometer that is an embodiment of an ion analyzer according to the present invention is described below with reference to drawings. The mass spectrometer in the present embodiment is a matrix laser desorption/ionization-ion trap (MALDI-IT) mass spectrometer, in which ions generated by a matrix-assisted laser desorption/ionization (MALDI) ion source are separated by an ion trap (IT) according to mass-to-charge ratio.

Figure 1:
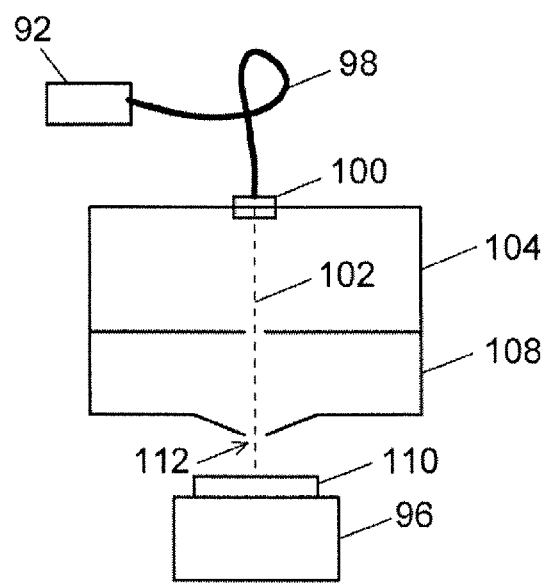
FIG. 1 is a conceptual diagram of an imaging mass spectrometer disclosed in Patent Literature 1.
Figure 2:
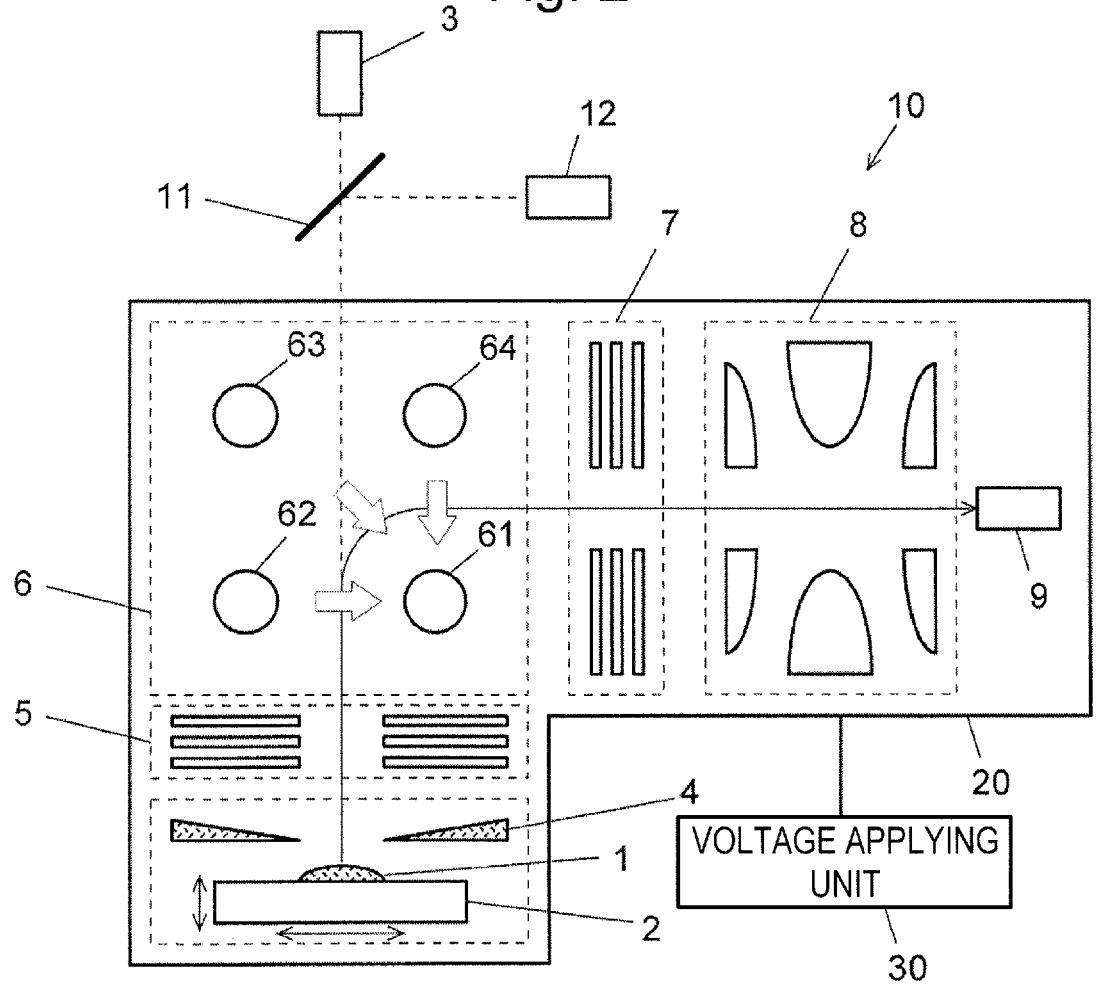
FIG. 2 is a configuration diagram of main part of an ion trap mass spectrometer that is an embodiment of a mass spectrometer according to the present invention.

FIG. 2 shows a configuration of main part of a mass spectrometer 10 in the present embodiment. In this mass spectrometer 10, a sample 1 placed on a sample stage 2 that is movable in horizontal and vertical directions is irradiated with laser light from a laser light source 3 from vertically upward to generate ions. A matrix material that easily absorbs the laser light from the laser light source 3 and is easily ionized, is applied to the sample 1 in advance. The matrix material incorporating sample molecules is microcrystallized. When irradiated with the laser light, the sample molecules are vaporized and ionized together with matrix material molecules. The generated ions are extracted upward by an extraction electrode 4, and a flight direction of the ions is focused by an ion lens 5, and then the ions enter a deflection unit 6.

The deflection unit 6 includes four rod electrodes 61 to 64. A voltage of a polarity opposite to that of the ions is applied to the rod electrode 61, and a voltage of the same polarity as the ions is applied to the other rod electrodes 62 to 64 by a voltage applying unit 30. Thus, a potential gradient as indicated by arrows in FIG. 2 is formed. The flight direction of the ions that have entered the deflection unit 6 is deflected in the horizontal direction along the potential gradient formed in a space surrounded by the rod electrodes 61 to 64.

The flight direction of the ions deflected in the horizontal direction is focused by an ion lens 7, and the ions enter an ion trap 8. A direct current voltage and a radio-frequency voltage that allow only ions having a predetermined range of mass-to-charge ratios to be trapped inside are applied to electrodes of the ion trap 8. The ions selected by the ion trap 8 are released at a given timing, and are detected by an ion detector 9 located in a stage subsequent to the ion trap 8.

Furthermore, a half mirror 11 and a camera 12 that acquires an image of a surface of the sample 1 through the half mirror 11 are disposed on a path of the laser light. When the sample 1 is measured, before the application of the matrix material, the surface of the sample 1 placed on the sample stage 2 is observed by the camera 12 to determine a region to be measured, and the sample stage 2 is moved appropriately so that the region to be measured is irradiated with the laser light. In the present embodiment, a measurement target position on the sample 1 is irradiated with the laser light to generate ions. It is also possible to perform imaging mass spectrometry by performing mass spectrometry of ions released from each region while shifting the region irradiated with the laser light on the surface of the sample 1 by moving the sample stage 2.

In the mass spectrometer 10 of the present embodiment, components other than the laser light source 3, the half mirror 11, and the camera 12 are housed in a housing 20. The housing 20 is maintained at a certain degree of vacuum by a vacuum pump that is not shown.

In the mass spectrometer of the present embodiment, the laser light is irradiated in a direction perpendicular to the surface of the sample 1. It is empirically known that by irradiating the sample 1 in the direction perpendicular to the surface of the sample 1, the efficiency of ion generation becomes high. The sensitivity of mass spectrometry is enhanced by adopting the configuration of the present embodiment. Furthermore, by irradiating the sample 1 in the direction perpendicular to the surface of the sample 1, a spot diameter of the laser light is minimized. Accordingly, the spatial resolution in a case of performing imaging mass spectrometry also becomes high.

Moreover, in the ion trap mass spectrometer of the present embodiment, ions released from the sample 1 are extracted in a direction substantially perpendicular to the surface of the sample 1. This configuration makes it possible to analyze ions released to various directions from the surface of the sample 1 with highest efficiency and to perform sensitive mass spectrometry.

Furthermore, in the ion trap mass spectrometer of the present embodiment, the deflection unit 6 deflects the flight direction of the ions in a direction orthogonal to the path of the laser light. Therefore, the ion lens 7, the ion trap 8, and the ion detector 9 disposed in a stage subsequent to the deflection unit 6 can be disposed away from an excitation beam optical system. By disposing these components in a direction orthogonal to the excitation beam optical system, the entire mass spectrometer can be made compact without enlarging the mass spectrometer in a specific direction.

Among mass spectrometers including an inductively coupled plasma ion source or the like that generates ions on a completely different principle from an ion source that generates ions by laser light irradiation just like the present embodiment, there are some configurations that deflect the flight direction of the generated ions. However, such configurations aim at separating only ions generated from a sample from neutral particles by deflecting the ions by an electric field. These configurations do not have a technical idea of irradiating a sample with laser light from a direction substantially perpendicular to a surface of the sample and performing mass spectrometry of ions extracted in the direction substantially perpendicular to the surface of the sample, as in the present invention.

Figure 3:
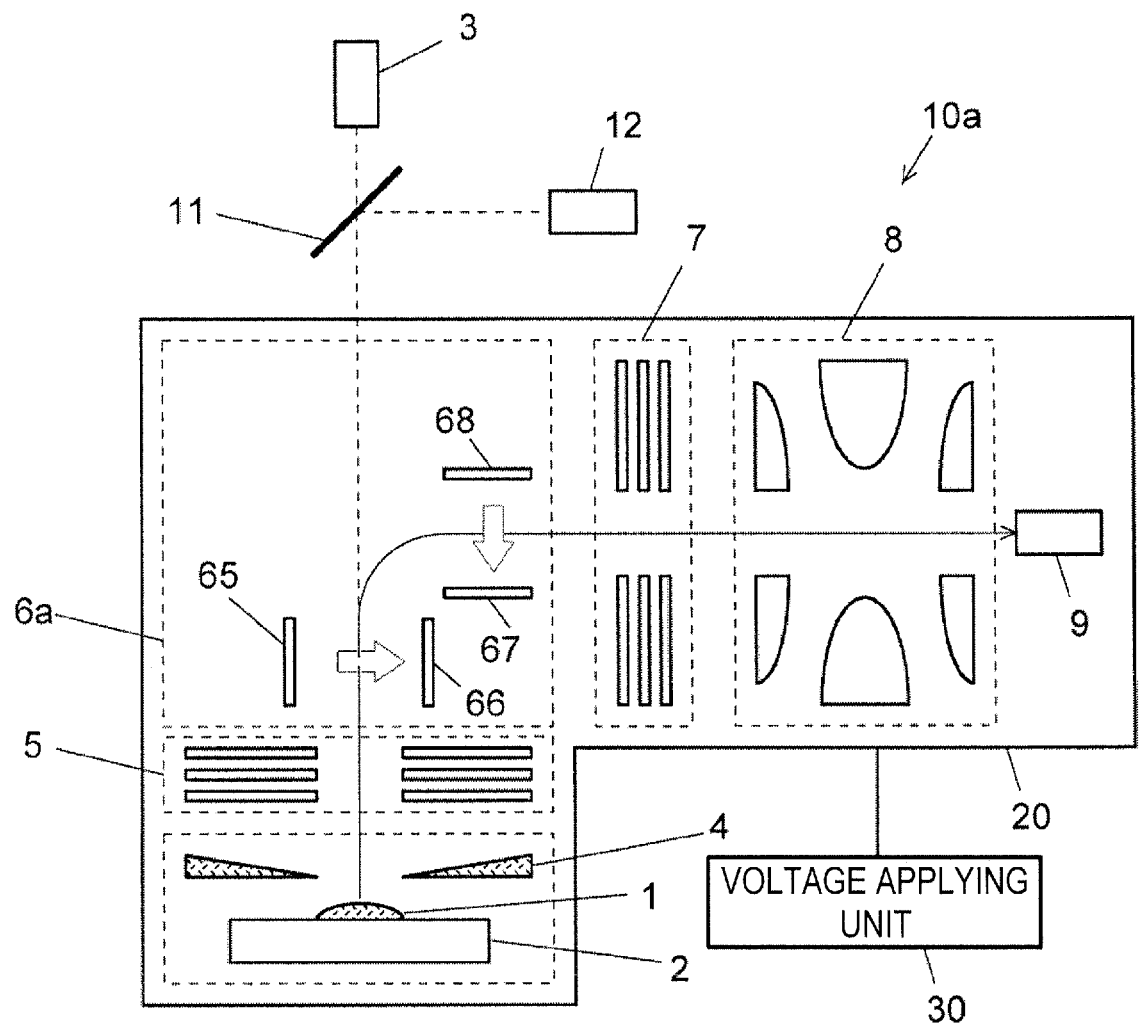
FIG. 3 is a configuration diagram of main part of an ion trap mass spectrometer that is a modification example of the mass spectrometer according to the present invention.
Figure 4:
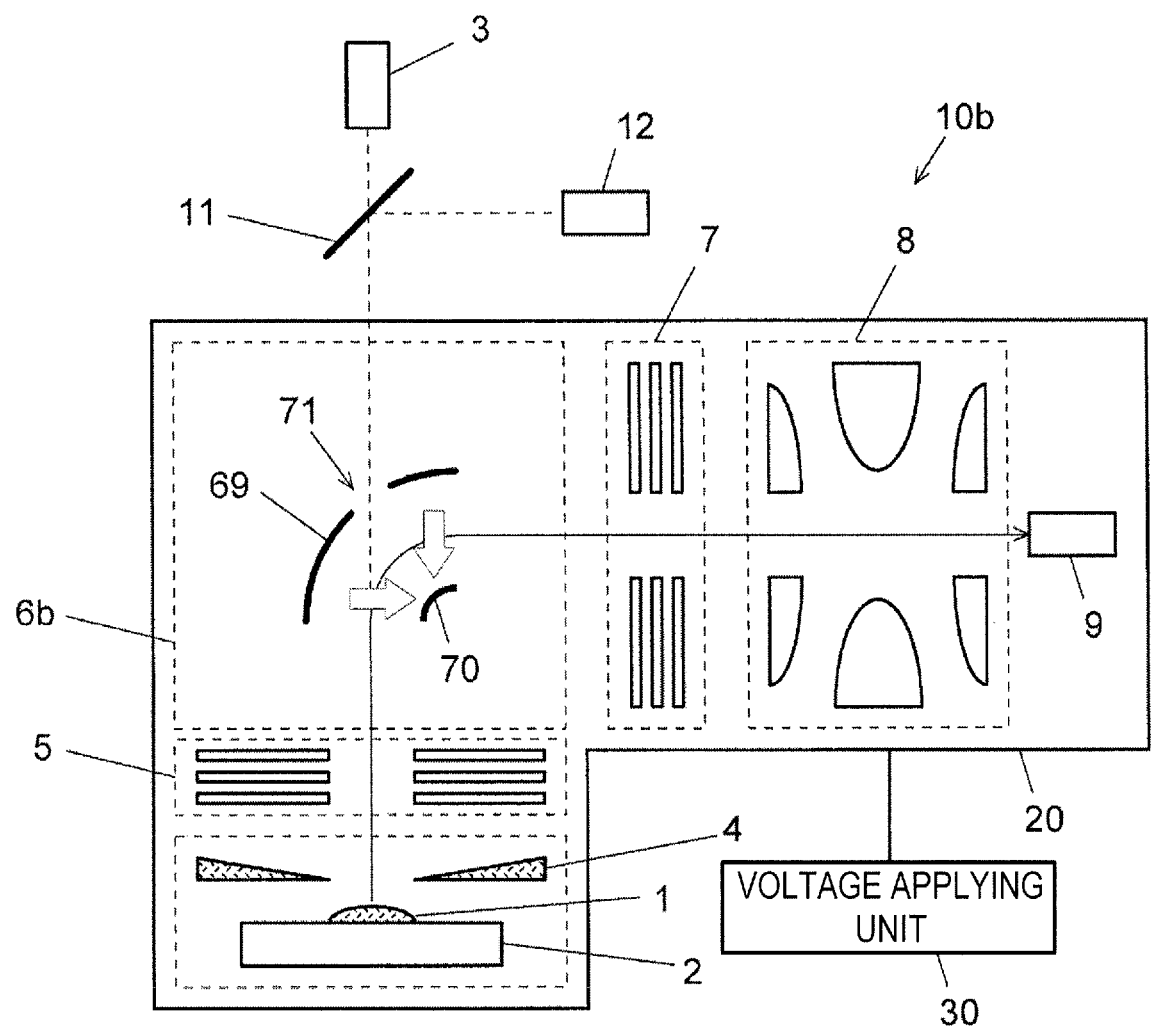
FIG. 4 is a configuration diagram of main part of an ion trap mass spectrometer that is another modification example of the mass spectrometer according to the present invention.

In an example shown in FIG. 2, the deflection unit 6 includes the four rod electrodes 61 to 64, and a voltage of the same polarity as ions or a polarity opposite to that of the ions is applied to each of the rod electrodes 61 to 64. This configuration is based on a technical idea to apply a voltage of a polarity opposite to that of the ions to an electrode disposed inside the deflected ion flight path and apply a voltage of the same polarity as the ions to an electrode disposed outside the ion flight path. Based on this technical idea, configurations other than the above-described embodiment may be adopted. Examples of these configurations are shown in FIGS. 3 and 4. It is to be noted that an ion trap mass spectrometer 10a in FIG. 3 and an ion trap mass spectrometer 10b in FIG. 4 have the same components as those in FIG. 2, except for a deflection unit. Components other than the deflection unit 6 are assigned the same reference numerals as those in FIG. 2, and description of the components is omitted.

In the configuration shown in FIG. 3, a pair of plate electrodes 65 and 66 are disposed on both sides of a flight path of ions moving vertically upward. A voltage of the same polarity as ions is applied to the plate electrode 65 located on the side opposite to the ion trap 8 with respect to the flight path, and a voltage of a polarity opposite to that of the ions is applied to the plate electrode 66 located on the same side as the ion trap 8. Furthermore, another pair of plate electrodes 67 and 68 are disposed also in a direction orthogonal to the pair of plate electrodes 65 and 66. A voltage of the same polarity as the ions is applied to the plate electrode 67 located on the side of the sample 1, and a voltage of the polarity opposite to that of the ions is applied to the plate electrode 68 located on the side opposite to the sample 1. Accordingly, a potential gradient that pushes the ions to a direction indicated by arrows in FIG. 3 is formed, and a flight direction of the ions is deflected in the horizontal direction as with the above-described embodiment.

In the configuration shown in FIG. 4, a pair of curved electrodes 69 and 70 are used. The curved electrode 69 disposed outside an ion trajectory is provided with an opening 71 in a position corresponding to an irradiation path of laser light. An inlet of the pair of curved electrodes 69 and 70 is disposed on a flight path of ions extracted from the sample 1. A voltage of the same polarity as the ions is applied to the curved electrode 69 located outside the flight path of the ions, and a voltage of a polarity opposite to that of the ions is applied to the curved electrode 70 located inside the flight path of the ions. Accordingly, a potential gradient that pushes the ions to a direction indicated by arrows in FIG. 4 is formed, and a flight direction of the ions is deflected in the horizontal direction as with the above-described embodiment.

The above-described embodiment is an example, and can be modified in accordance with the spirit of the present invention.

The above-described embodiments are mass spectrometers including an ion source that generates ions on the basis of the matrix-assisted laser desorption/ionization (MALDI) method. A mass spectrometer including an ion source that generates ions on the basis of the laser desorption/ionization (LDI) method that does not use a matrix material can also be configured in the same manner as above. Furthermore, instead of laser light, an excitation beam, such as a molecular beam, an ion beam, or an electron beam, can be used. Although an ion beam and an electron beam are a charged particle beam, these excitation beams are generally accelerated so as to have sufficiently large kinetic energy as compared with kinetic energy of ions generated from a sample, and therefore have no worries about being affected by an electric field formed in a deflection unit to deflect the flight direction of the ions.

The above-described embodiments are ion trap mass spectrometers. A mass spectrometer including a mass spectrometry unit (a time-of-flight mass spectrometry unit, a quadrupole mass spectrometry unit, etc.) other than an ion trap can also be configured in the same manner as above.

Furthermore, an ion analyzer (an ion mobility analyzer, etc.) other than a mass spectrometer can also be configured in the same manner as above.

REFERENCE SIGNS LIST 10, 10a, 10c . . . Ion Trap Mass Spectrometer
S . . . Sample
2 . . . Sample Stage
3 . . . Laser Light Source
4 . . . Extraction Electrode
5, 7 . . . Ion Lens
6, 6a, 6b . . . Deflection Unit
61 to 64 . . . Rod Electrode
65 to 68 . . . Plate Electrode
69, 70 . . . Curved Cylindrical Electrode
71 . . . Opening
8 . . . Ion Trap
9 . . . Ion Detector
11 . . . Half Mirror
12 . . . Camera
20 . . . Housing
30 . . . Voltage Applying Unit

The invention claimed is:

1. An ion analyzer comprising:
a sample placement unit on which a sample is to be placed;
an excitation beam irradiation unit configured to irradiate the sample placed on the sample placement unit with an excitation beam having a central axis that is perpendicular to a surface of the sample to generate ions from the sample;
an analysis unit configured to capture the ions and subsequently to separate and measure the ions in accordance with a predetermined physical quantity, the ions flying along a measurement axis which is perpendicular to the central axis;
a deflection unit including a first pair of rod electrodes or plate electrodes positioned on both sides of the central axis and a second pair of rod electrodes or plate electrodes positioned on both sides of the measurement axis, the deflection unit configured to make at least some of ions generated from the sample to fly in a direction of the measurement axis toward the analysis unit;

an extraction electrode interposed between the deflection unit and the sample placement unit, the extraction electrode configured to extract the ions at the surface of the sample away from the sample in a direction of the central axis; and an image acquiring unit configured to acquire an image of the surface of the sample, wherein an optical axis of the image acquiring unit is coincident with the central axis.

2. The ion analyzer according to claim 1, wherein the deflection unit further includes:

a voltage applying unit configured to apply a voltage of a polarity opposite to that of the ions to the electrode positioned inside a flight path of the ions.

3. The ion analyzer according to claim 1, wherein the deflection unit further includes:

a voltage applying unit configured to apply a voltage of a same polarity as the ions to the electrode positioned outside a flight path of the ions.

4. The ion analyzer according to claim 1, wherein the sample placement unit, the deflection unit, and the analysis unit are disposed in a space maintained at a certain degree of vacuum.

5. The ion analyzer according to claim 1, further comprising a movement mechanism configured to move the sample placement section.

6. The ion analyzer according to claim 1, wherein the excitation beam is laser light.

7. The ion analyzer according to claim 1, wherein the excitation beam irradiation unit, the deflection unit, the analysis unit and the image acquiring unit are positioned at corresponding positions to one side of the sample placement unit.

8. The ion analyzer according to claim 1, wherein the excitation beam irradiation unit, the deflection unit, the analysis unit and the image acquiring unit are positioned at corresponding locations above the sample placement unit.

9. The ion analyzer according to claim 1, further comprising a first ion lens interposed between the extraction electrode and the deflection unit configured to focus a flight direction of the ions extracted by the extraction electrode in a direction of the central axis.

10. The ion analyzer according to claim 9, further comprising a second ion lens interposed between the extraction electrode and the analysis unit to focus a flight direction of the ions in the direction of the measurement axis.

11. The ion analyzer according to claim 10, wherein the sample placement unit, the excitation beam irradiation unit, the analysis unit, the deflection unit, the extraction electrode, the first ion lens and the second ion lens are disposed in the same space defined by a housing that is maintained at a certain degree of vacuum.

* * * * *